United States Patent
Aoyagi

(10) Patent No.: US 7,925,150 B2
(45) Date of Patent: Apr. 12, 2011

(54) CAMERA SYSTEM, CAMERA BODY, FLASH DEVICE, AND ILLUMINATION METHOD

(75) Inventor: Hidehiko Aoyagi, Yokohama (JP)

(73) Assignee: Nikon Corporation, Tokyo (JP)

( * ) Notice: Subject to any disclaimer, the term of this patent is extended or adjusted under 35 U.S.C. 154(b) by 162 days.

(21) Appl. No.: 12/379,677

(22) Filed: Feb. 26, 2009

(65) Prior Publication Data

US 2009/0285573 A1    Nov. 19, 2009

(30) Foreign Application Priority Data

Mar. 27, 2008   (JP) ................ 2008-083228
May 14, 2008   (JP) ................ 2008-127191
Jan. 6, 2009   (JP) ................ 2009-000550

(51) Int. Cl.
*G03B 15/05* (2006.01)

(52) U.S. Cl. ........................ 396/157
(58) Field of Classification Search ........ 396/157
See application file for complete search history.

(56) References Cited

U.S. PATENT DOCUMENTS

| | | | |
|---|---|---|---|
| 5,440,368 A | | 8/1995 | Momochi |
| 2004/0041941 A1* | | 3/2004 | Takeshita ............ 348/371 |
| 2004/0075762 A1* | | 4/2004 | Okubo .............. 348/371 |
| 2009/0136224 A1* | | 5/2009 | Aoyagi ............... 396/157 |

FOREIGN PATENT DOCUMENTS

| | | |
|---|---|---|
| JP | A-8-242459 | 9/1996 |
| JP | A-2003-15179 | 1/2003 |
| JP | A-2005-173254 | 6/2005 |
| JP | A-2007-251902 | 9/2007 |

* cited by examiner

*Primary Examiner* — W. B. Perkey
(74) *Attorney, Agent, or Firm* — Oliff & Berridge, PLC

(57) ABSTRACT

A camera system includes: a light emitting unit that performs a main emission of light in which during photography a photographic subject is illuminated with a first light having a first color temperature, and a preparatory emission of light in which the photographic subject is illuminated with a second light having a second color temperature before photography; an imaging element that outputs an image capture signal; a calculator that calculates an amount of the first light by the light emitting unit, based upon the image capture signal output during the preparatory emission of light; a corrector that corrects the calculated amount of the first light, based upon a color temperature difference between the first color temperature and the second color temperature; and a controller that controls the light emitting unit to perform the main emission of light at the amount of the first light after correction by the corrector.

22 Claims, 9 Drawing Sheets

CAMERA SYSTEM, CAMERA BODY, FLASH DEVICE, AND ILLUMINATION METHOD

INCORPORATION BY REFERENCE

The disclosures of the following priority applications are herein incorporated by reference:
Japanese Patent Application No. 2008-083228 filed Mar. 27, 2008;
Japanese Patent Application No. 2008-127191 filed May 14, 2008; and
Japanese Patent Application No. 2009-000550 filed Jan. 6, 2009.

BACKGROUND OF THE INVENTION

1. Field of the Invention

The present invention relates to a camera system, a camera body, a flash device, and an illumination method.

2. Description of Related Art

In Japanese Laid-Open Patent Publication 2005-173254, there is disclosed a technique of performing a preparatory emission of light before the main emission of light during photography, and determining the amount of light to be emitted during the main emission of light on the basis of the amount of light reflected back from the photographic subject during the preparatory emission of light, when photography is to be performed using a flash device. Moreover, in Japanese Laid-Open Patent Publication 2003-15179, there is disclosed a technique in which the color temperature of the illumination light that is emitted by the flash device is controlled according to the color temperature of the ambient light. It is because that if there is a great difference between the color temperature of the ambient light and the color temperature of the flash light, an image results that imparts a sense of discomfort to the viewer because of irradiation by two different types of lights having different color temperatures respectively.

SUMMARY OF THE INVENTION

Each of the reflectivity of the photographic subject and the light reception sensitivity of the sensor that detects the amount of light reflected back from the photographic subject has a wavelength dependence that differs according to the wavelength of the light. Due to this, it is difficult to obtain a correct amount of light to be emitted during the main emission of light on the basis of the amount of light that is reflected back from the photographic subject during the preparatory emission of light, if the color temperature during the preparatory emission of light and the color temperature during the main emission of light are different.

Moreover if, during the preparatory emission of light that is performed before the main emission of light during photography, the preparatory emission of light is performed while matching its color temperature to the color temperature of the ambient light, then there is the problem that the accuracy of calculation of the amount of light for the main emission of light on the basis of the amount of light that is reflected back from the photographic subject during the preparatory emission of light may be decreased. This is because since the light emission efficiency of the flash differs according to the color temperature, if the light emission efficiency at the color temperature of the preparatory emission of light is bad, it may become impossible to provide proper illumination all the way to a photographic subject that is far away, because the amount of light during the preparatory emission of light becomes insufficient.

Furthermore if the amount of light that is emitted during the preliminary emission of light is increased in order to compensate for decrease of the light emission efficiency in the preparatory emission of light, there is the problem that the consumption of the electrical power of the battery is increased, and there may be a shortage of electrical power for the main emission of light.

A camera system according to the 1st aspect of the present invention comprises: a light emitting unit that performs a main emission of light in which during photography a photographic subject is illuminated with a first light having a first color temperature, and a preparatory emission of light in which the photographic subject is illuminated with a second light having a second color temperature that is different from the first color temperature before photography; an imaging element that captures an image of the photographic subject and outputs an image capture signal; a calculator that calculates an amount of the first light to be emitted by the light emitting unit during the main emission of light, on the basis of the image capture signal output from the imaging element during the preparatory emission of light; a corrector that corrects the amount of the first light to be emitted that has been calculated by the calculator, on the basis of a color temperature difference between the first color temperature and the second color temperature; and a controller that controls the light emitting unit to perform the main emission of light at the amount of the first light to be emitted after correction by the corrector.

According to the 2nd aspect of the present invention, it is preferred that in a camera system according to the 1st aspect, the corrector corrects the amount of the first light to be emitted that has been calculated by the calculator, on the basis of at least one of difference in sensitivity of the imaging element caused by the color temperature difference, and difference in reflectivity of the photographic subject caused by the color temperature difference.

According to the 3rd aspect of the present invention, it is preferred that in a camera system according to the 1st aspect, the light emitting unit includes a light source of which color temperature is variable; and the corrector corrects the amount of the first light to be emitted that has been calculated by the calculator, on the basis of at least one of: difference in sensitivity of the imaging element caused by the color temperature difference; difference in reflectivity of the photographic subject caused by the color temperature difference; and an amount of change between the amount of the first light to be emitted and an amount of the second light, caused by difference in light emission efficiency of the light emitting unit according to the color temperature difference.

According to the 4th aspect of the present invention, it is preferred that in a camera system according to the 3rd aspect, the light emission efficiency includes a first light emission efficiency at the first color temperature and a second light emission efficiency at the second color temperature; and the controller controls the light emitting unit so that the second light emission efficiency is higher than the first light emission efficiency.

According to the 5th aspect of the present invention, it is preferred that in a camera system according to the 3rd aspect, the controller controls the light emitting unit so that the first color temperature is matched to a third color temperature of ambient light.

According to the 6th aspect of the present invention, it is preferred that in a camera system according to the 5th aspect, the calculator calculates the third color temperature of the ambient light on the basis of the image capture signal output from the imaging element when the light emitting unit is performing the preparatory emission of light, and the image capture signal output from the imaging element while the light emitting unit is not emitting light.

According to the 7th aspect of the present invention, it is preferred that in a camera system according to the 1st aspect, the controller controls the light emitting unit so that the second color temperature is matched to a fourth color temperature of white light.

According to the 8th aspect of the present invention, it is preferred that in a camera system according to the 1st aspect, the light emitting unit includes a white light source that emits white light; and the controller further controls the light emitting unit so as to emit the white light from the white light source during the preparatory emission of light.

According to the 9th aspect of the present invention, it is preferred that in a camera system according to the 1st aspect, the imaging element includes an imaging element for photography, and an imaging element for photometry that is different from the imaging element for photography; and the corrector corrects the amount of the first light to be emitted that has been calculated by the calculator, on the basis of at least one of: difference in sensitivity of the imaging element for photography caused by the color temperature difference; difference in sensitivity of the imaging element for photometry caused by the color temperature difference; and difference in reflectivity of the photographic subject caused by the color temperature difference.

According to the 10th aspect of the present invention, a camera system according to the 9th aspect may further comprise: a color adjustor that performs color temperature adjustment upon an image signal for photography output from the imaging element for photography, based upon a color temperature adjustment coefficient that corresponds to the first color temperature of the main emission of light.

According to the 11th aspect of the present invention, it is preferred that in a camera system according to the 1st aspect the corrector calculates reflectivity of the photographic subject, on the basis of the image capture signal that is output from the imaging element when the light emitting unit is performing the preparatory emission of light and the image capture signal that is output from the imaging element when the light emitting unit is not emitting light.

A camera system according to 12th aspect of the present invention comprises: a light emitting unit of which color temperature is variable, and that performs both a preparatory emission of light and a main emission of light when performing photography; and a controller that controls a color temperature during the main emission of light on the basis of predetermined information, and controls a color temperature during the preparatory emission of light so that a light emission efficiency at the color temperature during the preparatory emission of light becomes greater than or equal to a light emission efficiency at the color temperature during the main emission of light.

According to the 13th aspect of the present invention, it is preferred that in a camera system according to the 12th aspect, the predetermined information is color temperature of at least a portion of the photographic subject; and further comprising a recognition unit that recognizes the color temperature of at least the portion of the photographic subject.

According to the 14th aspect of the present invention, it is preferred that in a camera system according to the 13th aspect, the recognition unit recognizes a color temperature of ambient light.

According to the 15th aspect of the present invention, it is preferred that in a camera system according to the 14th aspect, the light emitting unit performs control so that difference between the color temperature during the preparatory emission of light and the color temperature during the ambient light is less than or equal to a predetermined value.

According to the 16th aspect of the present invention, it is preferred that in a camera system according to the 12th aspect, the controller controls the color temperature during the preparatory emission of light to a color temperature at which the light emission efficiency is greater than or equal to a predetermined value.

According to the 17th aspect of the present invention, it is preferred that in a camera system according to the 12th aspect, the controller controls amount of light to be emitted during the main emission of light inconsideration of a difference between the light emission efficiency at the color temperature during the preparatory emission of light and the light emission efficiency at the color temperature during the main emission of light.

According to the 18th aspect of the present invention, a camera system according to the 12th aspect may further comprise: a storage unit that stores a relationship between the color temperature of the light emitting unit and the light emission efficiency.

A camera body according to the present invention, comprises: a recognition unit that is used in a camera system according to the 13th aspect of the present invention.

A flash device according to the 19th aspect of the present invention comprises: a light emitting unit that is used in a camera system according to the 12th aspect of the present invention.

According to the 20th aspect of the present invention, an illumination method in which a main light emission in which during photography a photographic subject is illuminated with a first light having a first color temperature, and a preparatory emission of light in which the photographic subject is illuminated with a second light having a second color temperature that is different from the first color temperature are performed before photography, comprises: capturing an image of the photographic subject and outputting an image capture signal during the preparatory emission of light; calculating an amount of the first light to be emitted during the main emission of light on the basis of the image capture signal; correcting the amount of the first light to be emitted that has been calculated, on the basis of a color temperature difference between the first color temperature and the second color temperature; and performing the main emission of light at the amount of the first light to be emitted after correction.

An illumination method according to the 21st aspect of the present invention comprises: performing a main emission of light in which a photographic subject is illuminated with light having a first color temperature during photography; determining a second color temperature that is different from the first color temperature, so that a light emission efficiency at the first color temperature is greater than or equal to a light emission efficiency at the second color temperature; and performing a preparatory emission of light in which the photographic subject is illuminated with light having the second color temperature before photography.

DESCRIPTION OF THE PREFERRED EMBODIMENTS

Embodiment One

Figure 1:
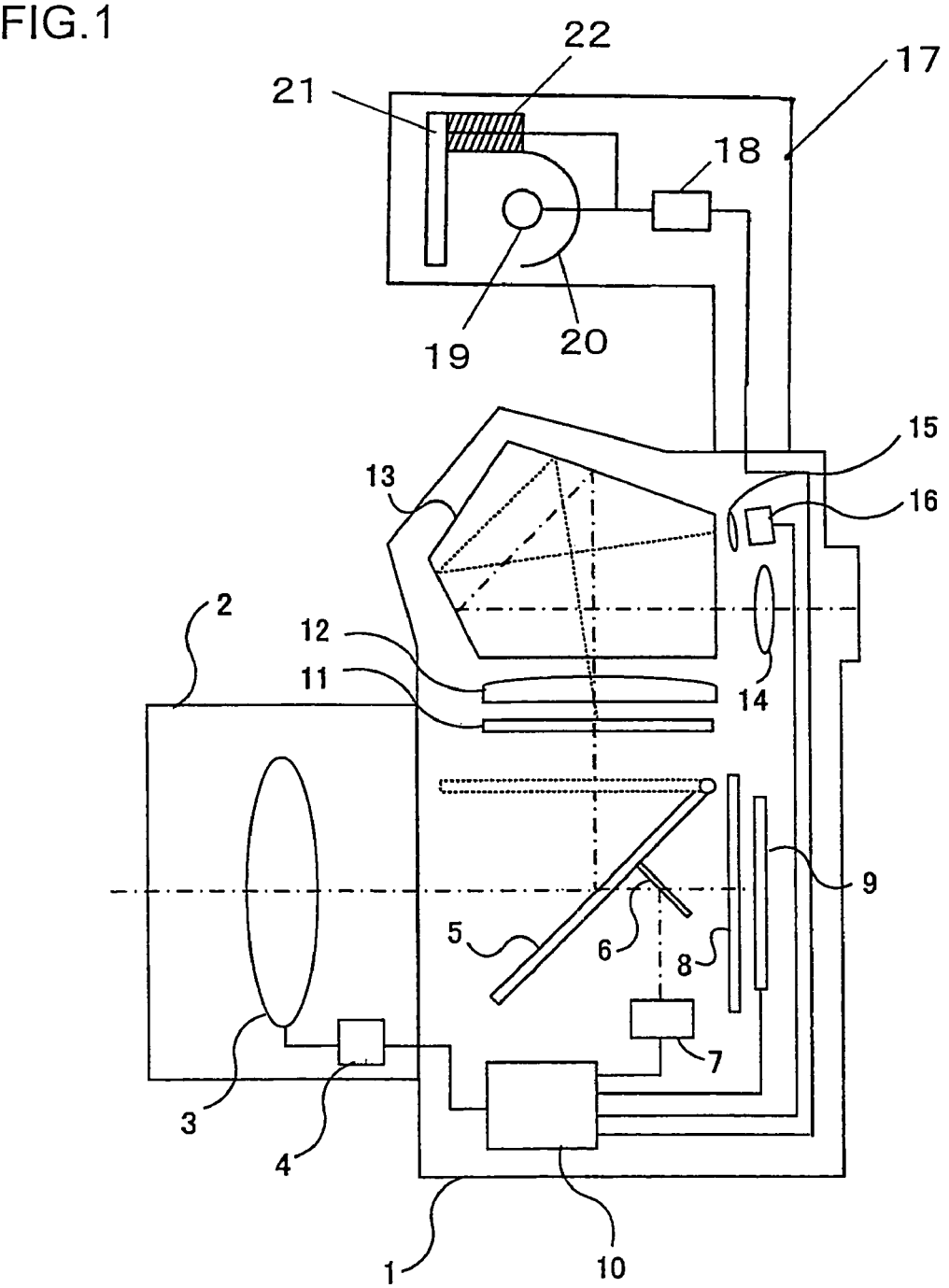
FIG. 1 is a figure for explanation of the structure of a single lens reflex camera system according to a first embodiment of the present invention.

Preferred embodiments for implementation of the present invention will now be explained with reference to the drawings. FIG. 1 is a figure for explanation of the structure of the principal portions of a single lens reflex camera system according to a first embodiment. In FIG. 1, an illumination device 17 and an interchangeable lens 2 are installed to the camera body 1 so as to be fittable and removable.

The light from the photographic subject that is incident upon the interchangeable lens 2 enters into the camera body 1 through a lens group 3 and an aperture not shown in the figures. Before shutter release, this light from the photographic subject that is incident into the camera body 1 is conducted upwards to a viewfinder unit by a quick return mirror 5 (hereinafter termed the "main mirror") that is positioned as shown by the solid lines, and is imaged upon a diffusing screen 11. Moreover, a portion of this light from the photographic subject that is incident into the camera body 1 is reflected downwards by a sub-mirror 6, and is also incident into a focus detection unit 7. This focus detection unit 7 includes a per se known AF sensor that operates according to the phase difference detection method, and is used during focus detection in which the focal adjustment state of the interchangeable lens 2 is detected.

The light from the photographic subject that is imaged upon the diffusing screen 11 is also incident upon a pentaprism 13 via a condenser lens 12. The pentaprism 13 conducts the incident light from the photographic subject to an eyepiece lens 14, while also conducting a portion thereof to an image re-forming lens 15. The image re-forming lens 15 forms an image of the photographic subject upon a photometric sensor 16. The photometric sensor 16 outputs an image signal for photometric processing according to the brightness of the photographic subject image. This photometric sensor 16 includes, for example, a CCD image sensor or the like that receives incident light via a color filter. From the image signal that has been obtained by the photometric sensor 16, apart from luminance information, it is also possible to acquire color information (color information about the ambient light).

After shutter release, the main mirror 5 moves to the position shown by the broken lines, and the light from the photographic subject is conducted to an image capture sensor 9 via a focal plane shutter 8, and forms an image of the photographic subject upon the photographic image surface of the sensor 9. This image capture sensor 9 includes a CCD image sensor or the like that has a plurality of photoelectric conversion elements corresponding to pixels. The image capture sensor 9 captures this image of the photographic subject formed upon its photographic image surface, and outputs an image signal for photography that corresponds to the brightness of the photographic subject image. After predetermined image processing has been performed upon this image signal by an image generation unit 109 that will be described hereinafter (refer to FIG. 3), it is recorded upon a recording medium by a recording unit 110 that will also be described hereinafter (refer to FIG. 3).

A micro computer 10 (hereinafter termed a "microcomputer") performs predetermined exposure calculation using the image signal from the photometric sensor 16. During shutter release operation this microcomputer 10 controls the focal plane shutter 8 and an aperture (not shown in the figures) that is provided within the interchangeable lens 2 on the basis of the result of this exposure calculation, and also controls the image capturing operation by the image capture sensor 9. Moreover, the microcomputer 10 includes a communication circuit that performs communication with the illumination device 17. The microcomputer 10 determines the color temperature of the required illumination light on the basis of the color information about the ambient light acquired by the photometric sensor 16. And the microcomputer 10 transmits a light emission color control signal to the illumination device 17, so that it emits illumination light of the color temperature that has been determined by the microcomputer 10.

It should be understood that it is arranged for the light emission color control signal to be transmitted from the camera body 1 to the illumination control device 17 in this embodiment. However, it would also be acceptable to arrange for the color temperature of the illumination light to be determined by an illumination control circuit 18 within the illumination device 17, that has received color temperature information relating to the ambient light from the side of the camera body 1.

Further, according to the focal adjustment state detected by the focus detection unit 7, the microcomputer 10 sends a control signal to a lens drive motor 4 that shifts a focusing lens included in the lens group 3 forwards and backwards along the direction of the optical axis. The rotational direction and the rotational amount of this drive motor 4 (i.e. the shift direction and the shift amount of the focusing lens) are determined on the basis of the detection signal from the focus detection unit 7. Due to this, focus adjustment upon the main photographic subject is performed automatically (AF processing).

A light emitting element 19 of the illumination device 19 consists of, for example, a xenon tube. The illumination control circuit 18 includes a charging circuit that performs charging of a capacitor not shown in the figures. According to a light emission command and a light emission control signal that are transmitted from the camera body 1, the illumination control circuit 18 causes this electrical charge to be discharged, so that the xenon tube 19 is caused to emit light by electrical discharge. This light emission control signal includes a signal that commands the amount of light to be emitted by the xenon tube 19. The light that is emitted by the xenon tube 19 is emitted in the leftwards direction in the figure via the color filter 21.

Figure 2:
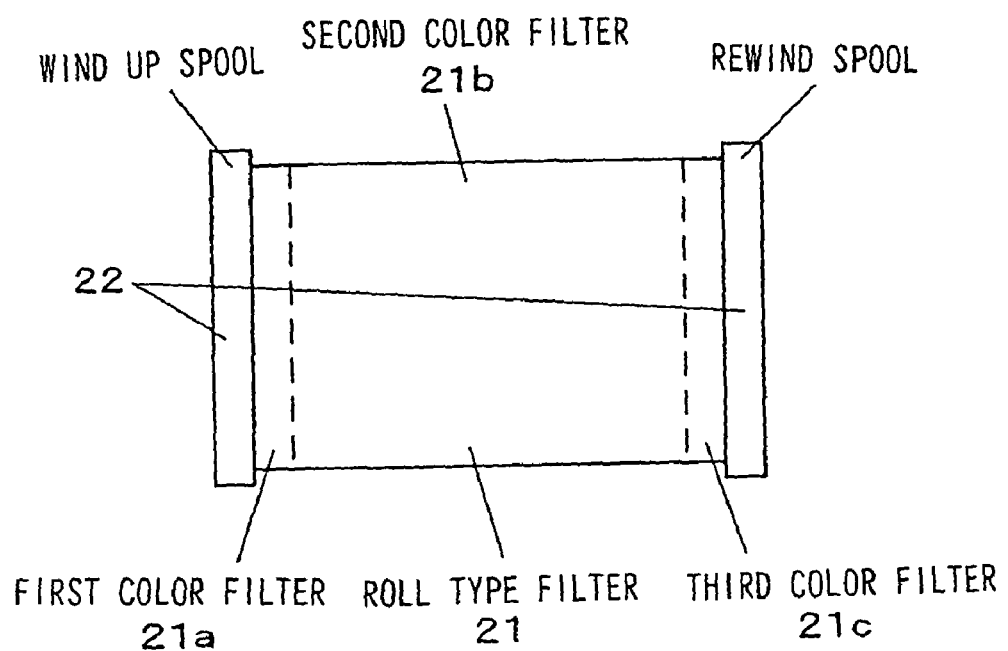
FIG. 2 is a figure showing an example of the structure of a color filter.

FIG. 2 is a figure showing an example of the detailed structure of the color filter 21. The color filter 21 in FIG. 2 includes a plurality of color filters 21a through 21c that are formed into a single roll, and that transmit light according to different wavelength profiles. By a similar construction to that of a film camera in which a film is wound up and rewound upon two spools, it is arranged for the portion of this color filter 21 that is positioned in front of the xenon tube 19 to be selectively changed.

According to commands from the illumination control circuit 18, a drive mechanism 22 performs driving to wind up, or to rewind, the spools described above. By controlling the drive amount of this drive mechanism 22 according to the above described light emission control signal that is transmitted from the camera body 1, the illumination control circuit 18 moves the color filter 21 so that a color filter of a predetermined color is positioned in front of the xenon tube 19. It should be understood that the light emission control signal includes a signal that orders a particular color temperature to be emitted through the color filter 21.

Figure 3:
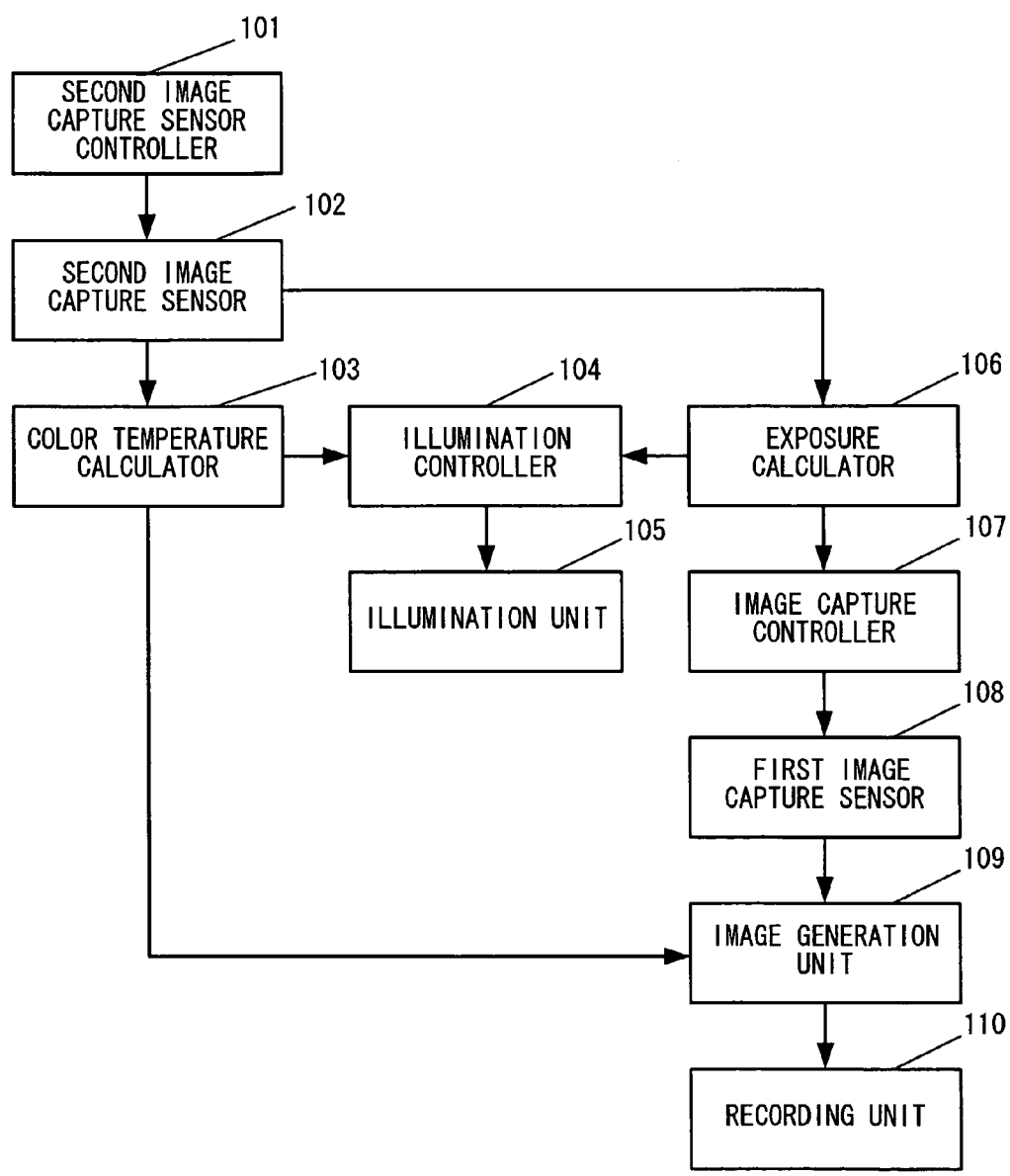
FIG. 3 is a functional block diagram of the camera system.

FIG. 3 is a functional block diagram of the camera system described above. In FIG. 3, a second image capture sensor 102 corresponds to the photometric sensor 16 (refer to FIG. 1). A first image capture sensor 108 corresponds to the image capture sensor 9 (refer to FIG. 1). Moreover, an illumination unit 105 corresponds to the illumination device 17 (refer to FIG. 1). A second image capture sensor controller 101, a color temperature calculator 103, an illumination controller 104, an exposure calculator 106, an image capture controller 107, and an image generation unit 109, collectively, correspond to the microcomputer 10 (refer to FIG. 1). It should be understood that the recording unit 110 is not shown in FIG. 1.

Since the camera system according to this embodiment is distinguished by performing photography by causing the illumination device 17 to perform emission of a preparatory emission of light that serves as auxiliary light for photography before its main light emission the explanation will center upon this photographic processing. In this preparatory emission of light, the illumination device 17 is caused to emit a small amount of light before photography, in order to determine the amount of illumination light necessary during photography (i.e. the amount of light to be emitted during the main emission of light). The camera system determines the amount of light to be emitted during the main emission of light required for photography, on the basis of the amount of light reflected back from the photographic subject during the preparatory emission of light.

Photographic Processing

Figure 4:
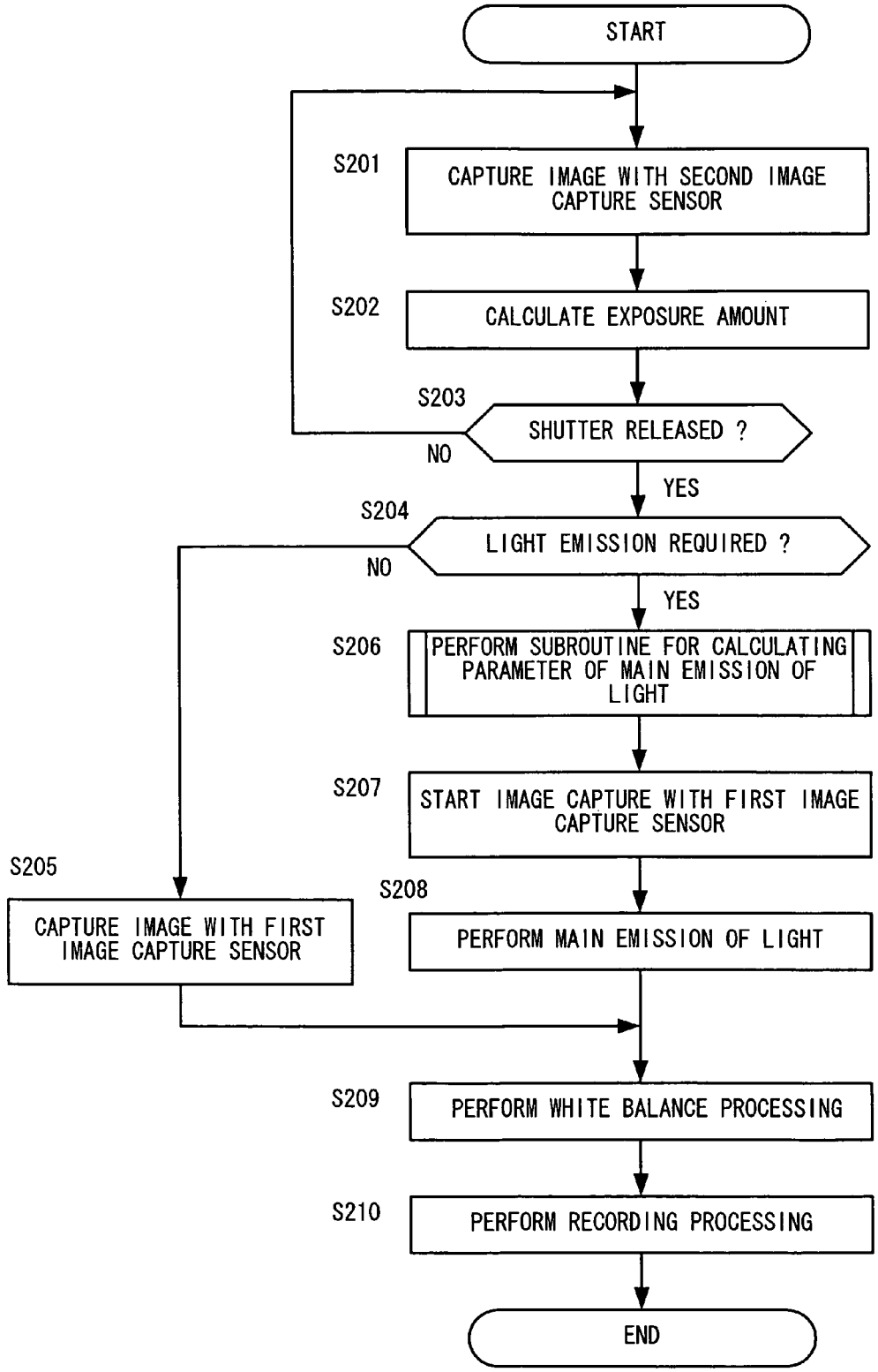
FIG. 4 is a flow chart for explanation of photographic processing performed by a microcomputer.

The flow of the photographic processing performed by the microcomputer 10 will now be explained with reference to the flow chart of FIG. 4. When a half press actuation signal is inputted that indicates that a release button not shown in the figures has been half press actuated, a program that performs processing according to FIG. 4 is started. Although this is not shown in the figures, it should be understood that AF processing is performed on the basis of an output that is detected by the focus detection unit 7 when this program starts.

In a step S201 of FIG. 4, the microcomputer 10 (i.e. the second image capture sensor controller 101) acquires image data for the photographic field of the second image capture sensor 102 (i.e., captures an image), and then the flow of control proceeds to a step S202. In this step S202, on the basis of the image data that has been acquired in the step S201, the microcomputer 10 (i.e. the exposure calculator 106) calculates the amount of exposure of the first image capture sensor 108 that is required during photography, and then the flow of control proceeds to a step S203. In concrete terms, it calculates luminance information for the photographic field using the image data, and then determines a shutter timing, an aperture value, and an ISO speed so as to obtain an appropriate exposure, on the basis of this luminance information.

In the step S203, the microcomputer 10 makes a decision as to whether or not shutter release actuation has been performed (in other words, a shutter release button has been actuated). If a full press actuation signal indicating that the shutter release button (not shown in the figures) has been actuated has been input, the microcomputer 10 reaches an affirmative decision in this step S203 and the flow of control proceeds to a step S204. Full press actuation is an actuation mode in which the shutter release button is pressed downwards more deeply than during half press actuation. On the other hand, if the full press actuation signal described above has not been inputted, then the microcomputer 10 makes a negative decision in this step S203, and the flow of control returns to the step S201. If the flow of control returns to the step S201, the processing of the steps S201 through S203 is repeated.

In a step S204, the microcomputer 10 (i.e. the exposure calculator 106) makes a decision as to whether or not emission of light by the illumination unit 105 is required. If light emission by the illumination unit 105 is permitted by the microcomputer 10 (i.e. the exposure calculator 106), and moreover it has been decided that light emission is necessary because the luminance information that was calculated in the step S202 is less than or equal to a predetermined luminance value, an affirmative decision is made in this step S204 and the flow of control is transferred to a step S206. On the other hand, if light emission by the illumination unit 105 is prohibited by the microcomputer 10 (i.e. the exposure calculator 106), or if, even though light emission is permitted, it has been decided that light emission is not necessary because the luminance information that was calculated in the step S202 is greater than the predetermined luminance value, a negative decision is made in this step S204 and the flow of control proceeds to a step S205. It should be understood that what is being decided upon here is whether or not any light emission is required as a main emission of light.

In the step S206, the microcomputer 10 (i.e. the illumination controller 104) performs processing according to a subroutine for calculating parameter of main emission of light, and then the flow of control proceeds to a step S207. The details of this subroutine for calculating parameter of main emission of light will be described hereinafter. In the step S207, the microcomputer 10 (i.e. the image capture controller 107) issues a command for the main mirror 5 to be rotated and causes the first image capture sensor 108 to start acquisition of image data for its photographic field (i.e. image capture), and then the flow of control proceeds to a step S208. In this case, the image capture controller 107 controls the image capturing by the first image capture sensor 108 so as to make the amount of exposure attain the value that was calculated in the step S202.

In the step S208, the microcomputer 10 (i.e. the illumination controller 104) controls the illumination unit 105 so as to emit auxiliary light for photography according to light emission conditions based upon the parameter of main emission of light that were calculated in the step S206, and then the flow of control proceeds to a step S209. Due to this, during the process of image capturing by the first image capture sensor 108, the illumination unit 105 emits light at the predetermined light amount and the predetermined color temperature.

In the step S209, the microcomputer 10 (i.e. the image generation unit 109) performs white balance adjustment processing upon the image data acquired by the first image capture sensor 108, on the basis of the color temperature information calculated in the step S206, and then the flow of control proceeds to a step S210. In this step S210, the microcomputer 10 sends a command to the recording unit 100 (see FIG. 3), so as to cause it to record the image data after the white balance adjustment processing upon a recording medium, and then the processing of FIG. 4 terminates.

If a negative decision has been made in the step S204 described above, the flow of control proceeds to a step S205, in which the microcomputer 10 (i.e. the exposure calculator 106) issues a rotation command to the main mirror 5 and causes the first image capture sensor 108 to acquire image data for its photographic field (i.e. to capture an image), and then the flow of control is transferred to the step S209. The image capture controller 107 controls the image capturing by the first image capture sensor 108 so as to implement the exposure amount that was calculated in the step S202 directly before the shutter release actuation. In this case, image capturing is performed without causing the illumination unit 105 to emit any light.

The subroutine for calculating parameter of main emission of light.

Figure 5:
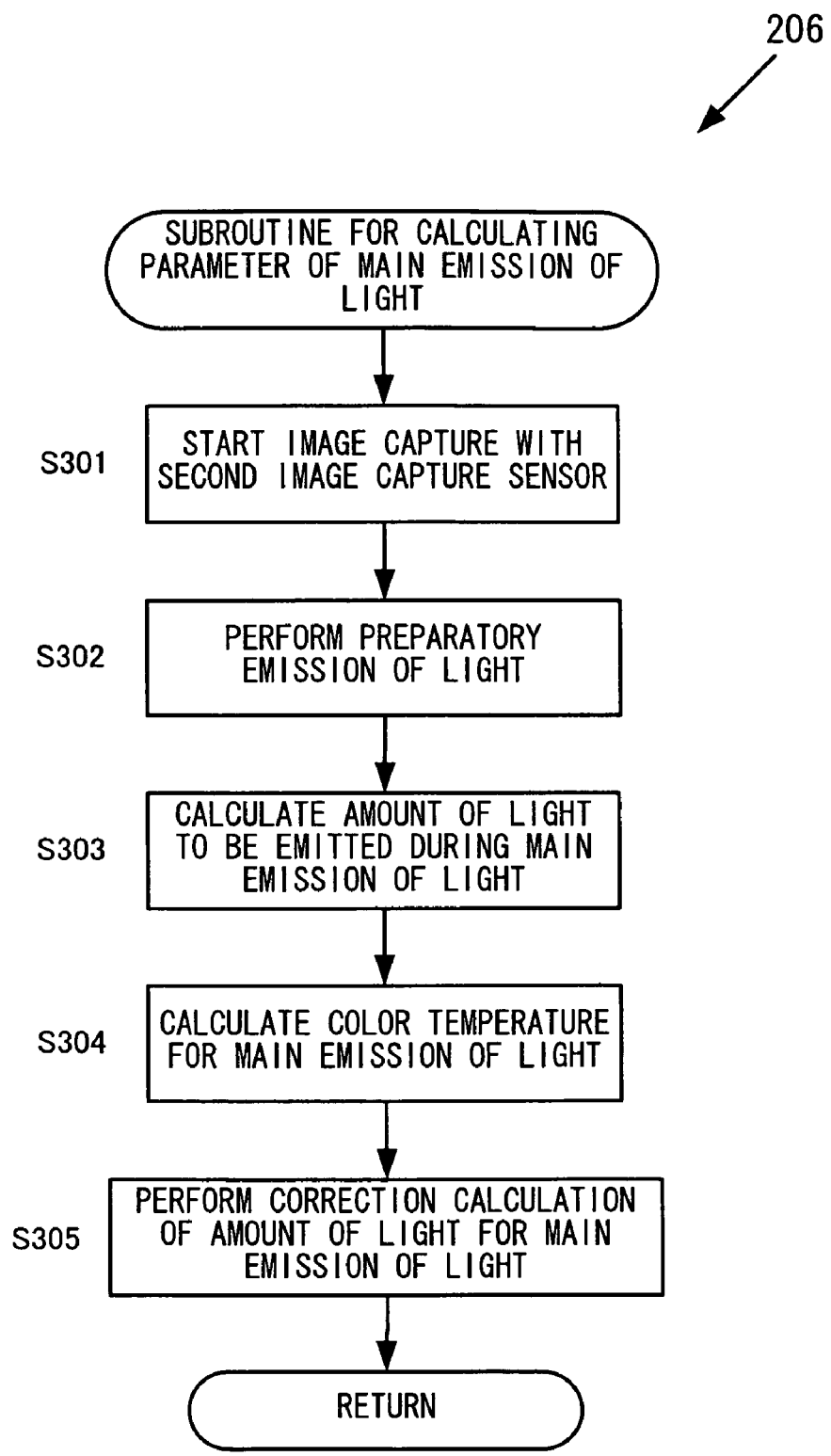
FIG. 5 is a flow chart showing a subroutine for calculating parameter of a main emission of light.

The flow of processing for calculating parameter of main emission of light performed by the microcomputer 10 will now be explained with reference to the flow chart of FIG. 5. In this subroutine, the light emission conditions for the auxiliary light for photography, in other words the amount of light for the main emission and its color temperature, are calculated. In a step S301 of FIG. 5, the microcomputer (the second image capture sensor controller 101) starts acquiring image data for the photographic field of the second image capture sensor 102 (i.e. starts image capture), and then the flow of control proceeds to a step S302.

In the step S302, the microcomputer 10 (i.e. the illumination controller 104) controls the illumination unit 105 so as to perform a preparatory emission of light at a color temperature (supposed to be K1) that, for example, corresponds to white colored light (white light), and then the flow of control proceeds to a step S303. In concrete terms, it commands the illumination control circuit 18 to drive the spools described above to wind up or rewind, so as to emit light at the color temperature K1 through the color filter. Due to this, the illumination unit 105 performs a preparatory emission of light with white colored light at a smaller light amount than during the main emission of light.

In the step S303, the micrometer 10 (i.e. the exposure calculator 106) calculates a main amount of light emission GN(K1), and then the flow of control proceeds to a step S304. In concrete terms, the microcomputer 10 (i.e. the exposure calculator 106) calculates luminance information for the photographic field on the basis of the image data during the preparatory emission of light described above. The microcomputer 10 (i.e. the exposure calculator 106) subtracts the luminance information calculated in the step S202 directly before shutter release operation while the preparatory emission of light was not taking place from the luminance information that has been calculated, so as to obtain reflected light amount data (hereinafter termed the "reflection data Rf1") specifying the amount of the light emitted during the preparatory emission of light that was reflected back by the photographic subject. And the microcomputer 10 (i.e. the exposure calculator 106) calculates an amount of light that is required to be emitted by the illumination unit 105 during the main emission of light for photography, on the basis of this reflected light amount during the preparatory emission of light.

The region in which the difference is large between the image data during the preparatory emission of light and the image data when the preliminary emission of light is not being performed corresponds to a photographic subject region that is present in the vicinity of the camera system and reflects back the light from the illumination unit 105 (i.e., to a region in the foreground). The microcomputer 10 (i.e. the exposure calculator 106) calculates the amount of light for the main emission of light so as to obtain an appropriate exposure in this region.

In the step S304, the microcomputer 10 (i.e. the color temperature calculator 103) calculates a color temperature for the main emission of light, and then the flow of control proceeds to a step S305. In concrete terms, the microcomputer 10 (i.e. the color temperature calculator 103) subtracts the above described luminance information while the preparatory emission of light was not taking place from the luminance information when the preparatory emission of light described above was performed, and thereby extracts the region in which light from the illumination unit 105 is not reflected back (i.e. the scenery region).

The region that is different from the foreground region described above corresponds to the scenery region that is present far away from the camera system and accordingly reflects back almost none of the light from the illumination unit 105 (i.e. that does not deliver any of the light from the illumination unit 105). The microcomputer 10 (i.e. the color temperature calculator 103) calculates average values Rm, Gm, and Bm for each of the colors in the RGB color data making up the image data in this region, and calculates the color temperature (termed "K2") of the ambient light (i.e. the ambient light) on the basis of the ratios of this Rm, Gm, and Bm. Here, information that specifies the relationship between the ratios of Rm, Gm, and Bm and the color temperature is stored in advance as a data table in a non-volatile memory (not shown in the figures) within the microcomputer 10. The microcomputer 10 (i.e. the illumination controller 104) commands the illumination control circuit 18 to drive the spools described above to wind up or to rewind, so that light of the color temperature K2 is emitted through the color filter.

The microcomputer 10 (i.e. the color temperature calculator 103) further determines an adjustment coefficient to be used during white balance adjustment processing. In concrete terms, the microcomputer 10 (i.e. the color temperature calculator 103) sets this adjustment coefficient to be suitable for ambient light at the color temperature K2.

In the step S305, the microcomputer 10 (i.e. the exposure calculator 106) corrects the amount of light for the main emission of light GN(K1) that was calculated in the step S303 according to the above described color temperature information. The microcomputer 10 (i.e. the illumination controller 104) orders this amount of light for the main emission of light GN(K2) after amendment from the illumination control circuit 18, and then the processing according to FIG. 5 terminates.

The details of the corrections performed in the step S305 will now be explained.

[1] Correction According to the Light Emission Efficiency of the Illumination Unit 105.

If the intensity of the light that is emitted from the illumination unit 105 is different between the color temperature K1 and the color temperature K2, the microcomputer 10 (i.e. the exposure calculator 106) performs correction using a correction amount H1 according to the following Equation (1):

$$H1 = \text{Log } 2\{I(K2)/I(K1)\} \qquad (1)$$

Here, I(K2) is the light emission intensity at the color temperature K2, and I(K1) is the light emission intensity at the color temperature K1. Moreover, information that specifies the relationship between the light emitting intensity and the color temperature is stored in advance as a data table in a non-volatile memory (not shown in the figures) within the illumination control circuit 18. This information is sent from the illumination control circuit 18 to the microcomputer 10 (i.e. to the exposure calculator 106).

[2] Correction According to the Sensitivity Feature of the First Image Capture Sensor 108.

If the light reception sensitivity of the first image capture sensor 108 (i.e. its photoelectric conversion efficiency) is different between the color temperature K1 and the color temperature K2, the microcomputer 10 (i.e. the exposure calculator 106) performs correction using a correction amount H2 according to the following Equation (2):

$$H2 = \text{Log } 2\{S1(K2)/S1(K1)\} \quad (2)$$

Here, S1(K2) is the light reception sensitivity of the first image capture sensor 108 at the color temperature K2, and S1(K1) is the light reception sensitivity of the first image capture sensor 108 at the color temperature K1. Moreover, information that specifies the relationship between the light reception sensitivity of the first image capture sensor 108 and the color temperature is stored in advance as a data table in a non-volatile memory (not shown in the figures) within the microcomputer 10.

[3] Correction According to the Sensitivity Feature of the Second Image Capture Sensor 102.

If the light reception sensitivity of the second image capture sensor 102 (i.e. its photoelectric conversion efficiency) is different between the color temperature K1 and the color temperature K2, the microcomputer 10 (i.e. the exposure calculator 106) performs correction using a correction amount H3 according to the following Equation (3):

$$H3 = -\text{Log } 2\{S2(K2)/S2(K1)\} \quad (3)$$

Here, S2(K2) is the light reception sensitivity of the second image capture sensor 102 at the color temperature K2, and S2(K1) is the light reception sensitivity of the second image capture sensor 102 at the color temperature K1. Moreover, information that specifies the relationship between the light reception sensitivity of the second image capture sensor 102 and the color temperature is stored in advance as a data table in a non-volatile memory (not shown in the figures) within the microcomputer 10.

[4] Correction According to the Reflectivity of the Photographic Subject.

If the strength of the light that is reflected back by the photographic subject is different between the color temperature K1 and the color temperature K2, the microcomputer 10 (i.e. the exposure calculator 106) performs correction using a correction amount H4 according to the following Equation (4):

$$H4 = \text{Log } 2(Rf2/Rf1) \quad (4)$$

Here, Rf2 is the reflection data for the foreground that is supposed to be valid, when the illumination unit 105 is caused to perform light emission at the color temperature K2 during the main emission of light, and moreover at the same amount of emitted light as during the preparatory emission of light. Rf1 is the reflection data that was calculated in the step S304, and is reflection data for the foreground during the preparatory emission of light at the color temperature K1. The reflection data Rf2 is given by the following Equation (5):

$$Rf2 = PF(K2) \times OC \quad (5)$$

Here, PF(K2) is the spectral distribution data of the light that is emitted by the illumination unit 105 when it is set to the color temperature K2 during the main emission of light. Moreover, this spectral distribution data for the illumination unit 105 is stored in advance as a data table in a non-volatile memory (not shown in the figures) within the microcomputer 10. The data for the color temperature K2 is sent from the illumination control circuit 18 to the microcomputer 10 (i.e. to the exposure calculator 106).

Moreover, OC is the spectral distribution data of the reflectivity of the photographic subject, and is calculated according to the following Equation (6):

$$OC = Rf1/(PF(K1)) \quad (6)$$

Here, Rf1 is the reflection data that was calculated in the step S304. And PF(K1) is the spectral distribution data of the light that is emitted by the illumination unit 105 when it is set to the color temperature K1. Among the above described table data that is stored in the non-volatile memory (not shown in the figures) within the microcomputer 10, the data for the color temperature K1 is sent from the illumination control circuit 18 to the microcomputer 10 (i.e. to the exposure calculator 106).

The microcomputer 10 (i.e. the exposure calculator 106) corrects the amount of light for the main emission of light GN(K1) before correction as shown by the following Equation (7), using the correction amounts H1 through H4, and thereby obtains an amount of light for the main emission of light after amendment GN(K2):

$$GN(K2) = GN(K1) \times \{(\sqrt{2})^{\wedge}(H1+H2+H3+H4)\} \quad (7)$$

According to the first embodiment as explained above, the following beneficial operational effects are obtained.

(1) In photography with auxiliary light that uses illumination light from the illumination device 17 as light that is auxiliary to the ambient light (the ambient light), it is arranged to perform correction with the correction amount H3. The correction amount H3 is the difference between the light reception sensitivities (i.e. the photoelectric conversion efficiencies) of the photometric sensor 16 (i.e. the second image capture sensor 102) due to the color temperature difference between the preparatory emission of light for determining the amount of light that will be required during photography, and the main emission of light. As a result since it is possible to obtain an adequate amount of light for the main emission of light, it is possible to reduce the possibility that the amount of light in the image that is photographed will be too high or too low.

(2) In addition to (1) as described above, it is arranged to perform correction with the correction amount H2 that is the difference in the light reception sensitivity (i.e. the photoelectric conversion efficiency) of the image capture sensor 9 (i.e. the first image capture sensor 108) due to the color temperature difference between the preparatory emission of light and the main emission of light. Due to this, it is possible to obtain an adequate amount of light for the main emission of light.

(3) Moreover, it is arranged to perform correction with the correction amount H4 that is the difference in the reflectivity of the photographic subject due to the color temperature difference between the preparatory emission of light and the main emission of light. Due to this, it is possible to obtain an adequate amount of light for the main emission of light.

(4) Even further, it is arranged to perform correction with the correction amount H1 that is the difference in the light emission efficiency of the illumination device 17 between the color temperature during the preparatory emission of light and the color temperature during the main emission of light. Due to this, it is possible to obtain an adequate amount of light for the main emission of light.

(5) Still further, it is arranged to match the color temperature of the preparatory emission of light to the color temperature of white colored light. For example, if it is not possible to acquire the color temperature information correctly from a scenery region in a dark environment where the ambient light level is insufficient, it is necessary to acquire the color temperature information on the basis of the reflected light from the photographic subject that is the foreground region. Thus, by matching the preparatory emission of light to the color temperature of white colored light, it is possible to acquire various type of color information for the photographic subject more correctly, as compared to the case of illumination with light whose color temperature is reddish or bluish.

(6) The photographic subject region (the foreground region) and the scenery region are distinguished on the basis of the difference between the image data during the preparatory emission of light and the image data when that preparatory emission of light was not being performed. As a result, it is possible to distinguish these regions without even using the range-finding information.

(7) It is arranged to match the color temperature of the main emission of light to the color temperature of the ambient light (the ambient light). Due to this, it is possible to reduce the sense of discomfort that the photographer experiences from the photographed image, as compared to the case of illumination with light whose color temperature is different from that of the ambient light.

(8) It is arranged to set the white balance adjustment coefficient to correspond to the color temperature of the main emission of light. Due to this, it is possible to reduce the sense of discomfort that the photographer experiences from the photographed image, as compared to the case in which white balance adjustment (i.e. color temperature adjustment) is performed corresponding to a color temperature that is different from that of the main emission of light.

Variant Embodiment #1

Although an example has been explained in which the preparatory emission of light and the main emission of light were both performed by the illumination device 17, it would also be acceptable to perform the preparatory emission of light with an LED light source, and to perform the main emission of light with the illumination device 17. In this case, the LED light source should be one that emits white colored light. Moreover, it may be arranged for the LED light source to be one that is dedicated to the preparatory emission of light, or for it also to serve as an auxiliary light source for autofocusing, or as a display light for self timer operation or the like.

Variant Embodiment #2

Although in the above explanation the color temperature was explained as being the two temperatures K1 and K2 for convenience, the actual illumination light is not monochrome, but has a certain width in its color temperature. Because of this, in the various equations described above, it would also be acceptable to perform integration with respect to the color temperature, or to use some values within the color temperature width as representative values.

Variant Embodiment #3

While, in the above explanation, it was arranged to perform correction by adding together all of the correction amounts H1, H2, H3, and H4, it would also be acceptable to use any combination thereof would be acceptable, provided that at least one thereof is used.

Variant Embodiment #4

In the above explanation, while an example was explained of an illumination device 17 of the type that is installed to an accessory shoe upon the camera body 1, it would also be possible to apply the present invention to a system in which the illumination unit is housed internally within the camera (in other words, to apply the present invention to a camera with integrally incorporated flash).

Variant Embodiment #5

As the camera body 1, an example has been explained of an electronic camera that performs image capturing with a first image capture sensor 108 (i.e. with the image capture sensor 9). However, instead of this, the present invention may also be applied to a silver halide camera that performs image capturing with a photosensitive medium such as a film or the like. In the case of such a silver halide camera, the exposure of this photosensitive medium would be started in the step S207. In this case, the processing of the steps S209 and S210 would be unnecessary.

Variant Embodiment #6

The present invention may also be applied to an electronic camera that is not of the single lens reflex type, or to a camera whose photographic lens cannot be removed (i.e. an integrated lens type camera). In this case, the image capture sensor 9 that is used for photography may also serve as the sensor for photometry. In other words, it would be acceptable to calculate the luminance information and the color temperature information for the photographic field (in the steps S202 and S206) on the basis of image data that has been acquired by the image capture sensor 9. In particular, when the camera is set to a live view mode in which the image captured by the image sensor 9 is displayed in real time upon a display unit (such as an LCD or the like) not shown in the figures, the display unit being provided upon the rear surface of the camera body 1 (i.e. upon the right side of the camera body 1 in FIG. 1), then it is desirable to calculate the color temperature information on the basis of the image capture signal from the image capture sensor 9 during this live view. If this is done as described above, since the sensor that is used for obtaining the color temperature and the sensor that is used for the actual image capture are the same, there is the advantageous aspect that it becomes unnecessary to give any consideration to the influence of discrepancies between the sensors upon the light reception sensitivity.

Variant Embodiment #7

Figure 6:
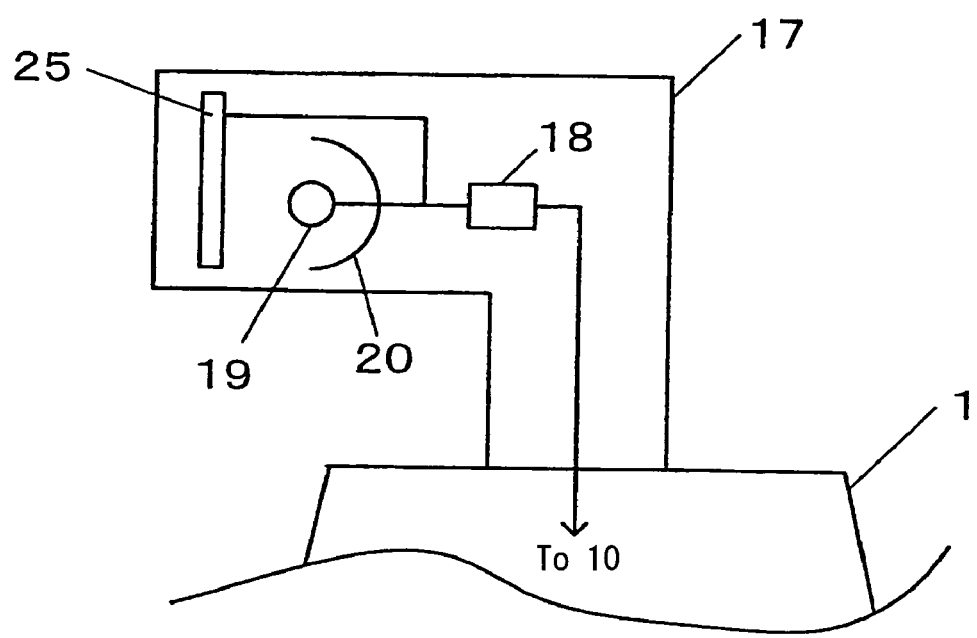
FIG. 6 is a figure showing another example of the structure of the illumination device.

By way of example, the color filter 21 of the illumination device 17 was explained as having a roll type form, and as being wound up upon a spool construction. Instead of this, as shown by way of example in FIG. 6, it would also be acceptable to provide a color-variable filter 25 whose color is variable such as one consisting of a liquid crystal panel or the like in front of the xenon tube 19, and to arranged to control the color of this color-variable filter 25 electrically.

Variant Embodiment #8

In the embodiment described above, while it was arranged to use a xenon tube as the light emitting element of the illumination device 17, it would also be acceptable to utilize some other type of light source. For example, it might be arranged for the light emitting element to consist of a red color LED 19*a*, a green color LED 19*b*, and a blue color LED 19*c*. In this case, the illumination control circuit 18 would supply drive electrical currents to these LEDs 19*a*, 19*b*, and 19c according to light emission commands and light emission control signals transmitted from the camera body 1, so as to make the various LEDs emit light. These light emission control signals may include a light emission color control signal that commands the ratios of the light emitting intensities of the LEDs 19a, 19b, and 19c (in other words, the color temperature of the illumination light to be emitted by the illumination device 17), and an amount of emitted light control signal that commands amounts of light to be emitted by the LEDs 19a, 19b, and 19c. The amounts of light emitted by the LEDs 19a, 19b, and 19c may be changed by increasing or decreasing the electrical currents respectively supplied to these LEDs. The ratios of the light emitting intensities of the LEDs 19a, 19b, and 19c may be varied by varying the ratios of these electrical currents that are supplied to these various LEDs.

Variant Embodiment #9

It would also be acceptable to arrange for it to be possible to vary the color temperature of the preparatory emission of light itself to any desired color temperature. For example, it would be acceptable to arrange to make it possible to vary the color temperature during the preparatory emission of light on the basis of the color temperature of the photographic scene (i.e. on the basis of the color temperature of the ambient light). To cite a concrete example, although fundamentally the color temperature of the preparatory emission of light is set to white color, if for example the photographic scene is a reddish photographic scene due to the influence of red colored ambient light (for example if it is a sunset scene), it is arranged to perform the preparatory emission of light with the color temperature of the preparatory emission of light set to white color with a slight tinge of red.

When performing this type of control, it may be arranged for the color temperature of the ambient light to be acquired using the photometric sensor 16, as also described in the above embodiment. It should be understood that the color temperature of the main emission of light in the case of this photographic scene is set so as to match the color temperature of this red colored ambient light. Although it is possible to control the color temperatures of the preparatory emission of light and the main emission of light individually, even if due to this control the color temperatures of the preparatory emission of light and the main emission of light are different, still it is possible to calculate an appropriate amount of light for the main emission of light by performing correction calculation upon the amount of light for the main emission in the manner described above.

In the variant embodiment described above, it has been explained that the color temperature of the preparatory emission of light is set by taking white color as a base, and by taking into account the color temperature component of the ambient light in this white color. However, it would also be acceptable to perform control so as to match the color temperature of the preparatory emission of light to the color temperature of the ambient light. And, for example, a system may be adopted in which the color temperature of the preparatory emission of light is set on the basis of the result of photometry of the ambient light (i.e. upon the output of the photometric sensor 16) under the condition that, as previously described, no light is being emitted by the illumination device 17, and in which the color temperature of the main emission of light is set on the basis of the color temperature of the photographic scene that is obtained during this preparatory emission of light. In this case, there is a possibility that the color temperatures that are set for the preparatory emission of light and for the main emission of light may be different. With the present invention, by performing correction calculation upon the amount of light for the main emission as described above, it is possible to calculate an appropriate amount of light for the main emission in this case as well.

Embodiment Two

A second embodiment of the present invention as applied to a single lens reflex digital camera will now be explained. It should be understood that this second embodiment of the present invention is not limited to a camera of this type; the present invention could also be applied to a camera of some other type, such as for example a compact camera that incorporates an integral flash unit (flash device), or a silver halide film camera or the like.

Figure 7:
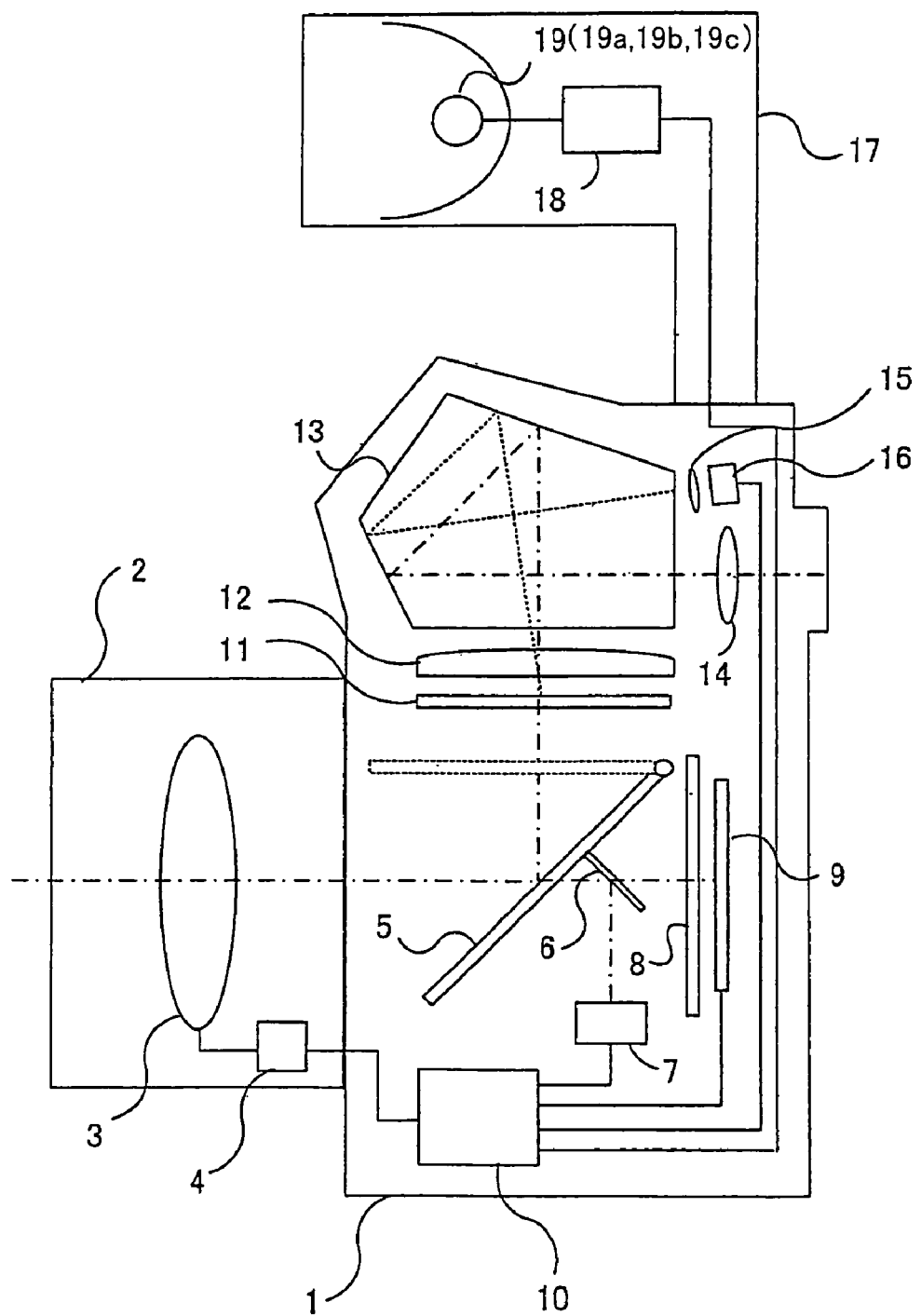
FIG. 7 is a figure for explanation of the structure of a single lens reflex camera system according to a second embodiment of the present invention.

FIG. 7 is a horizontal sectional view showing the structure of this camera according to the second embodiment of the present invention. In this camera of the second embodiment, a lens unit 2 and a flash unit (flash device) 17 are mounted to a camera body 1 so as to be freely fitted thereto and detached therefrom. The lens unit 2 includes a photographic lens 3 and a motor 4 that performs focus adjustment and so on, and the flash unit 17 includes an illumination control circuit 18 and a light emitting element 19 and so on.

The camera body 1 includes a main mirror 5, a sub-mirror 6, a focus detection unit 7, a focal plane shutter 8, a first image capture sensor 9, a control device 10, a diffusing screen 11, a condenser lens 12, a pentaprism 13, an eyepiece lens 14, an image re-forming lens 15, a second image capture sensor 16, and so on.

The first image capture sensor 9 generates a high image quality image signal by photoelectrically converting an image of the photographic subject, and outputs this signal. Moreover, the second image capture sensor 16 generates an image signal by photoelectrically converting an image of the photographic subject, and outputs this signal. The image signal that is output from the second image capture sensor 16 is used for analysis of the photographic scene and for calculation of the photographic conditions and the image processing conditions for the first image capture sensor 9, and for calculation of the light emission conditions (i.e. the amount of light to be emitted, the color temperature, and so on) of the flash unit 17, and the like.

The main mirror 5, the sub-mirror 6, the focal plane shutter 8, and the first image capture sensor 9 are arranged along the optical axis of the photographic lens 3. Moreover, a viewfinder optical system is disposed in the region above the main mirror 5, and the focus detection unit 7 is disposed in the region below the sub-mirror 6.

When photography is not taking place, the main mirror 5 is positioned upon the photographic optical path from the photographic lens 3 to the first image capture sensor 9, so that the ray bundle from the photographic subject that has passed through the photographic lens 3 is reflected upwards and is conducted to the viewfinder optical system. On the other hand, during photography, the main mirror 5 and the sub-mirror 6 are raised upwards out of the way, so that the ray bundle from the photographic subject that has passed through the photographic lens 3 passes through the focal plane shutter 8 and is conducted to the first image capture sensor 9, so that an image of the photographic subject is formed upon the light reception surface of the first image capture sensor 9. The first image capture sensor 9 performs photoelectric conversion upon this image of the photographic subject and generates an image signal.

The central portion of the main mirror 5 is made as a semi-transparent half mirror, and a portion of the photographic subject ray bundle that has passed through the main mirror 5 is reflected downwards by the sub-mirror 6 and is conducted to the focus detection unit 7 when photography is not taking place. The focus detection unit 7 detects the focus adjustment state (i.e. the defocus amount) of the photographic lens 3 on the basis of this ray bundle from the photographic subject that it has received.

The viewfinder optical system includes a diffusing screen 11, a condenser lens 12, a pentaprism 13, an eyepiece lens 14, and an image re-forming lens 15. The diffusing screen 11 is disposed above the main mirror 5, and an image of the photographic subject is formed thereupon by the ray bundle that is reflected by the main mirror 5 when photography is not being performed. This image of the photographic subject that has been imaged upon the diffusing screen 11 is conducted via the condenser lens 12, the pentaprism 13, and the eyepiece lens 14 to the eye of the photographer, and can be visually checked by the photographer.

Moreover, this image of the photographic subject that has been imaged upon the diffusing screen 11 is conducted via the condenser lens 12, the pentaprism 13, and the image reforming lens 15 to the second image capture sensor 16, so that an image of the photographic subject is re-formed upon the second image capture sensor 16. The second image capture sensor 16 performs photoelectric conversion upon this image of the photographic subject and generates an image signal. The image re-forming lens 15 and the second image capture sensor 16 constitute a photometric device for this camera, and the luminance of the photographic subject and the color temperature of the photographic subject are detected by this photometric device. It should be understood that the method of detection of the color temperature of the photographic subject is not limited to being the method of this embodiment; it would also be acceptable to arrange to recognize the color temperature of the photographic field by some other method, with some detector other than this photometric device.

The control device 10 includes a microcomputer and peripheral elements such as memory and the like, and performs various types of calculation and control for this camera.

The light emitting element 19 of the flash unit 17 includes a red color LED 19a, a green color LED 19b, and a blue color LED 19c. The illumination control circuit 18 supplies electrical current to these three colored LEDs 19a through 19c according to a light emission control signal from the control device 10, and thereby causes them to emit light. The amounts of light emitted by these three colored LEDs 19a through 19c are determined according to the electrical currents supplied thereto, and thus the color temperature of the flash can be varied according to adjustment of the ratios of the electrical currents supplied to the three colored LEDs 19a through 19c.

Figure 8:
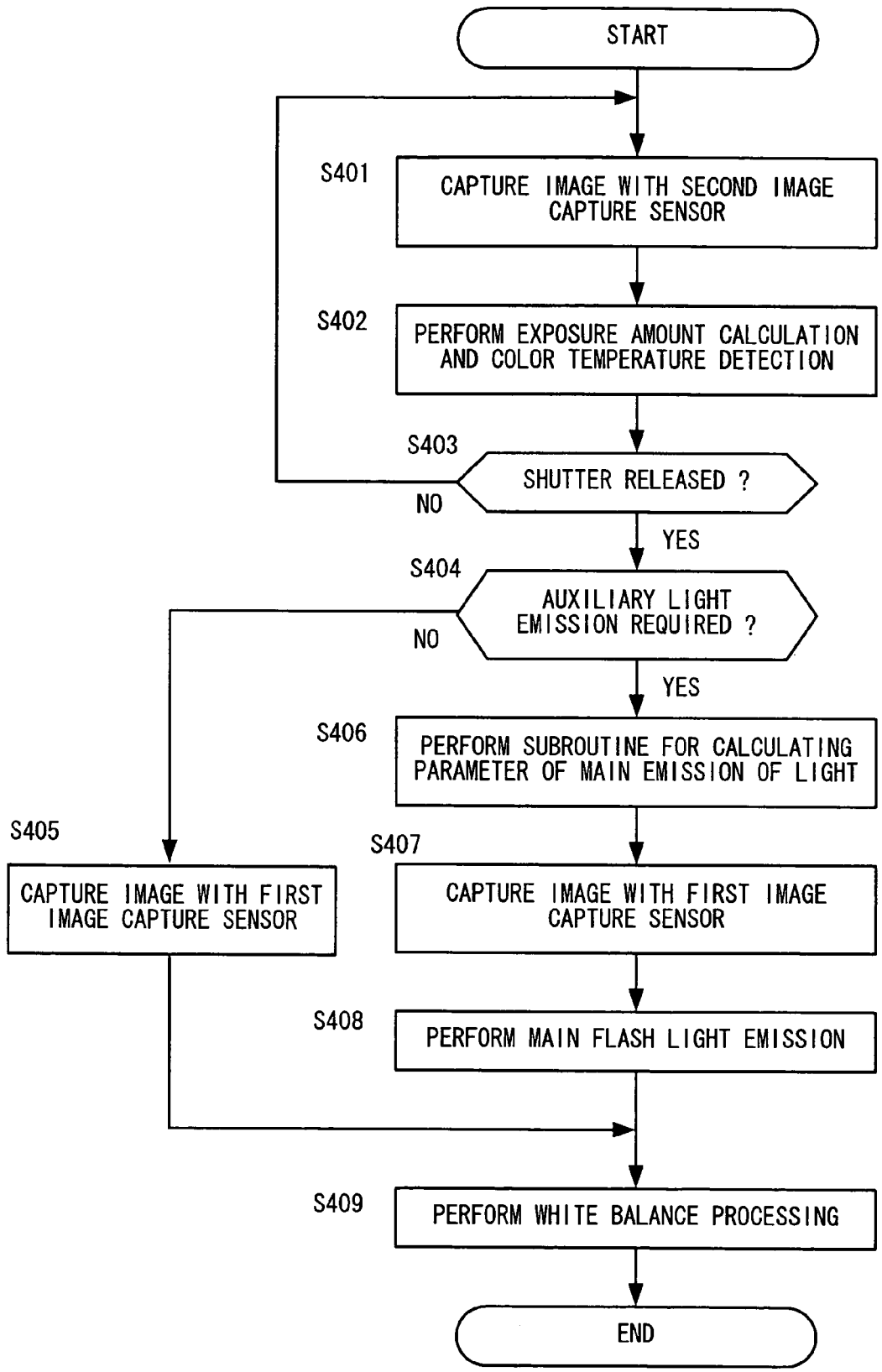
FIG. 8 is a flow chart for explanation of photographic processing in this second embodiment.

FIG. 8 is a flow chart showing the photographic operation of the camera of the second embodiment. The operation of this embodiment will now be explained with reference to this flow chart. When the power supply to the camera is turned on and the shutter release button is half pressed, the control device 10 starts the photographic operation shown in FIG. 8.

In a step S401, the second image capture sensor 16 is drive controlled and an image signal for the photographic subject is acquired. In the next step S402, the luminance of the photographic field is detected on the basis of the image signal received from the second image capture sensor 16, and, along with calculating an amount of exposure for the first image capture sensor during photography, also the color temperature of the ambient light (in the image of the photographic subject, the background of the main photographic subject and the vicinity of the periphery of the main photographic subject) is detected. This color temperature will be termed K1.

In the next step S403, a decision is made as to whether or not a shutter release button (not shown in the figures) has been actuated, and, until such release actuation has been performed, the processing of the steps S401 and S402 is repeated. However, when release actuation has been performed, the flow of control proceeds to a step S404, in which a decision is made as to whether or not it is necessary for the flash unit 17 to emit light during photography. For example it may be decided that it is necessary to emit auxiliary light, if the luminance of the photographic subject detected in the step S402 described above is lower than some predetermined value.

If it has been decided that the luminance of the photographic subject is greater than or equal to the predetermined value so that auxiliary emission of light during photography is not necessary, the flow of control proceeds to a step S405, in which the first image capture sensor 9 is exposed with the amount of exposure that was calculated in the step S402. After this exposure the flow of control proceeds to a step S409, in which image processing with a white balance coefficient is performed upon the image signal from the first image capture sensor 9, and then the resulting image is stored in a memory (not shown in the figures). This white balance coefficient is set so that it is possible to recreate a piece of white paper as being white under ambient light of the color temperature of the ambient light that was detected in the step S402. In other words, the gains that are applied to the various colors are set so that the ratios of the RGB outputs from the first image capture sensor 9 become 1:1:1.

Figure 9:
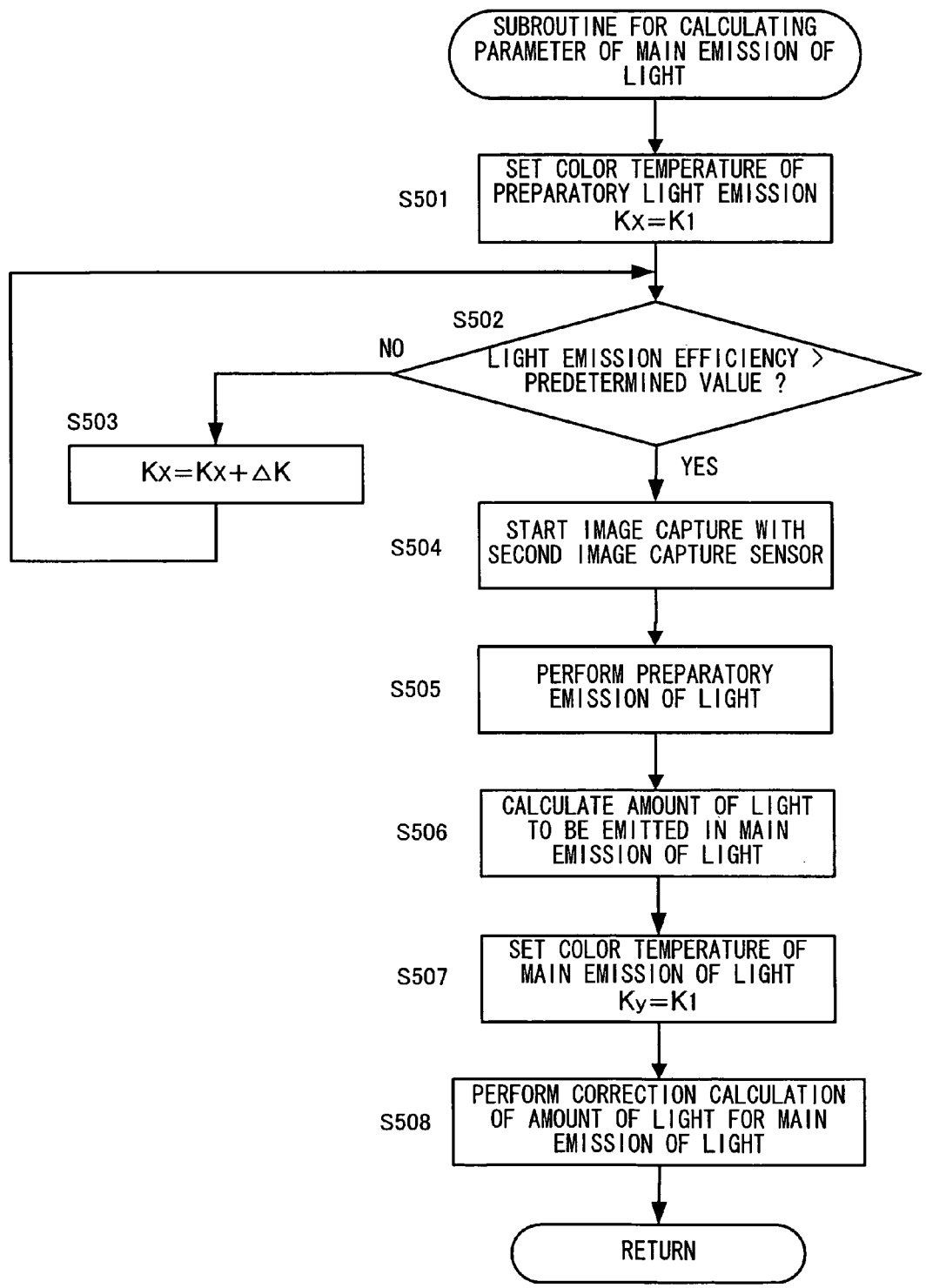
FIG. 9 is a flow chart showing a subroutine for calculating parameter of main emission of light.

On the other hand, if it is considered to be necessary to perform auxiliary emission of light during photography because the luminance of the photographic subject is less than the predetermined value, the flow of control proceeds to a step S406, in which a subroutine for calculating parameter of main emission of light shown in FIG. 9 is executed by performing a preparatory emission of light and calculating an amount of light to be emitted during the main emission of light. The details of this subroutine will be described hereinafter.

Next the flow of control proceeds to a step S407, in which the exposure of the first image capture sensor 9 according to the amount of exposure that has been calculated in the step S402 is started, and main emission of light by the flash unit 17 is performed in the step S408 during this exposure. In a step S409 after photography, image processing is performed upon the image signal of the first image capture sensor 9 using a white balance coefficient, and the resulting image is stored in a memory (not shown in the figures).

Next, the calculation processing that is performed during the preparatory emission of light, in order to determine the parameters for the main emission of light, will be explained with reference to FIG. 9. In a step S501, the color temperature K1 of the ambient light that was detected in the step S402 of FIG. 8 is set as the color temperature Kx of the preparatory emission of light.

Then in a step S502 a decision is made as to whether or not the light emission efficiency when preparatory emission of light is performed at the color temperature Kx will be greater than or equal to a predetermined value. A data table of light emission efficiency against changing color temperature of light emission is stored in a memory of the flash unit 17 (not shown in the figures), and the light emission efficiency that corresponds to the color temperature Kx is found by looking in this data table from the flash unit 17.

If the light emission efficiency is less than the predetermined value, the flow of control proceeds to a step S503, in which the color temperature during the preparatory emission of light is changed by just the value ΔK. The method for setting ΔK is as follows. It would be acceptable to store in advance a table of the color temperatures for which the light emission efficiency is high, so that the light emission efficiency becomes greater than or equal to the predetermined value, and to select by reference to the table that color temperature that is closest to the color temperature Kx, and then to set ΔK so that the color temperature Kx after change becomes this color temperature. Or, each time the processing of the step S503 is executed, it would be acceptable to arrange for ΔK to be set so that the color temperature Kx after change shifts by a predetermined amount with respect to the color temperature Kx of the ambient light before change, alternatingly in the high temperature direction and in the low temperature direction.

If the light emission efficiency is greater than the predetermined value, the flow of control proceeds to a step S504, in which the second image capture sensor 16 is drive controlled to start its photometric operation, and then in a step S505 during this photometry, preparatory emission of light is performed by the flash unit 17, so that the amount of light from the preparatory emission of light that is reflected back from the photographic subject is measured on the basis of the image signal from the second image capture sensor 16.

In the next step S506, the amount of light GN1 to be emitted during the main emission of light is calculated on the basis of the image data from the second image capture sensor that has been obtained at the color temperature Kx during the preparatory emission of light, and the image data from the second image capture sensor 16 directly before the preparatory emission of light (acquired in the steps S401 and S402 of FIG. 8) that was stored in advance in the memory. It should be understood that detailed explanation of the method of calculation of the amount of light to be emitted during the main emission of light on the basis of the result of the preparatory emission of light, is here omitted, since this calculation is per se conventional.

In the next step S507, the color temperature K1 of the ambient light that was detected in the step S402 of FIG. 8 is set as the color temperature Ky for the main emission of light.

In a final step S508, correction of the amount of light GN1 to be emitted during the main emission of light is performed on the basis of the difference between the light emission efficiency at the color temperature Kx during the preparatory emission of light, and the light emission efficiency at the color temperature Ky for the main emission of light. The amount of light for the main emission of light after amendment GN2 is calculated according to the following Equation (8):

$$GN2 = GN1 + \log_2(E(Kx)/E(Ky)) \quad (8)$$

In Equation (8), the standard light emission efficiencies when light is emitted at the color temperatures Kx and Ky are respectively termed E(Kx) and E(Ky). For example, if the light emission efficiency E(Kx) during the preparatory emission of light is equal to 80%, and the light emission efficiency E(Ky) during the main emission of light is equal to 40%, then:

$$GN2 = GN1 + 1 \quad (9)$$

When setting the color temperature of the amount of light for the main emission in the step S507 of FIG. 9, it would also be acceptable to arrange to calculate the color temperature and the white balance coefficient during the main emission of light on the basis of the image data during the above described preparatory emission of light, and on the basis of the image data when no light was being emitted. First, the difference between the image data during the preparatory emission of light and the image data when no light was being emitted is obtained. The region in which this difference is large is the region in which the photographic subject is present, and this may be termed the foreground. On the other hand, the region in which this difference is small is the region in which the photographic subject is not present, and this may be termed the background. For example, the color temperature of the ambient light may be calculated on the basis of the ratios of average value between the RGB luminance data corresponding to the background region. A table may be stored in the control device 10 in advance, in which these ratios and color temperatures are held in mutual correspondence. The color temperature of the flash during the main emission of light is made to be almost equal to the color temperature of the ambient light. Moreover, the white balance coefficient should be set so that it is possible to recreate a piece of white paper as being white, under this ambient light. In other words, the gains that are applied to the various colors are set so that the RGB ratios become 1:1:1.

In the second embodiment described above, while an example was shown in which the color temperature of the flash of the flash unit 17 was adjusted by controlling the ratios of the electrical currents supplied to the three colored LEDs 19a through 19c that were provided to the flash unit 17, the method of adjusting the color temperature of the flash of the flash unit 17 is not to be considered as being limited to being the method described above. For example, it would be possible to employ the adjustment method of the first embodiment of FIG. 1, or the adjustment method of Variant Embodiment #7.

For example, in the first embodiment shown in FIG. 1, the illumination control circuit 18 could control the drive mechanism 22 according to a light emission control signal from the control device 10, and could select the color filter 21 according to a color temperature command. In the variant embodiment #7, the illumination control circuit 18 could control the color temperature of the color-variable filter 25 (for example, color crystal panel) according to a color temperature command.

Moreover while the color temperature of the ambient light was measured by the second image capture sensor and the color temperature for the main emission of light was obtained thereby in the second embodiment described above, it would also be acceptable to arrange for the photographer to set the color temperature of the main emission of light manually. In the step S402, it would also be acceptable to take as the value K1 a color temperature that has been set manually by the photographer with a color temperature manual setting unit not shown in the figures on the camera body 1 or the flash unit 17 and to perform the subsequent calculations based thereupon. In this case, it will be acceptable for the luminance sensor to be a monochrome (black/white) sensor, since there is no need for it to acquire any color information.

Since the preparatory emission of light is performed at a color temperature for which the light emission is better than for that of the main emission of light in this manner according to the second embodiment, it is possible to suppress the consumption of electrical power, and to monitor all the way out to a photographic subject that is relatively far away, and moreover it is possible to obtain an adequate amount of light for the main emission of light.

Furthermore since, the color temperature during the preparatory emission of light is controlled to be in the vicinity of the color temperature of the ambient light, and moreover so as to attain a color temperature value at which the light emission efficiency of the flash unit 17 is greater than or equal to the predetermined value according to the second embodiment, it is possible to calculate the amount of light to be emitted during the main emission of light on the basis of the result of the preparatory emission of light in a more accurate manner in addition to the advantageous effects described above.

Moreover since the amount of light emitted during the main emission of light is controlled in consideration of the difference between the light emission efficiency at the color temperature during the preparatory emission of light and the light emission efficiency at the color temperature during the main emission of light according to the second embodiment, in addition to the advantageous effects described above, it is possible to obtain the amount of light to be emitted during the main emission of light in a more accurate manner.

The above described embodiments are examples, and various modifications can be made without departing from the scope of the invention.

What is claimed is:

1. A camera system, comprising:
    a light emitting unit that performs a main emission of light in which during photography a photographic subject is illuminated with a first light having a first color temperature, and a preparatory emission of light in which the photographic subject is illuminated with a second light having a second color temperature that is different from the first color temperature before photography;
    an imaging element that captures an image of the photographic subject and outputs an image capture signal;
    a calculator that calculates an amount of the first light to be emitted by the light emitting unit during the main emission of light, on the basis of the image capture signal output from the imaging element during the preparatory emission of light;
    a corrector that corrects the amount of the first light to be emitted that has been calculated by the calculator, on the basis of a color temperature difference between the first color temperature and the second color temperature; and
    a controller that controls the light emitting unit to perform the main emission of light at the amount of the first light to be emitted after correction by the corrector.

2. A camera system according to claim 1, wherein:
    the corrector corrects the amount of the first light to be emitted that has been calculated by the calculator, on the basis of at least one of difference in sensitivity of the imaging element caused by the color temperature difference, and difference in reflectivity of the photographic subject caused by the color temperature difference.

3. A camera system according to claim 1, wherein:
    the light emitting unit includes a light source of which color temperature is variable; and
    the corrector corrects the amount of the first light to be emitted that has been calculated by the calculator, on the basis of at least one of: difference in sensitivity of the imaging element caused by the color temperature difference; difference in reflectivity of the photographic subject caused by the color temperature difference; and an amount of change between the amount of the first light to be emitted and an amount of the second light, caused by difference in light emission efficiency of the light emitting unit according to the color temperature difference.

4. A camera system according to claim 3, wherein:
    the light emission efficiency includes a first light emission efficiency at the first color temperature and a second light emission efficiency at the second color temperature; and
    the controller controls the light emitting unit so that the second light emission efficiency is higher than the first light emission efficiency.

5. A camera system according to claim 3, wherein:
    the controller controls the light emitting unit so that the first color temperature is matched to a third color temperature of ambient light.

6. A camera system according to claim 5, wherein:
    the calculator calculates the third color temperature of the ambient light on the basis of the image capture signal output from the imaging element when the light emitting unit is performing the preparatory emission of light, and the image capture signal output from the imaging element while the light emitting unit is not emitting light.

7. A camera system according to claim 1, wherein:
    the controller controls the light emitting unit so that the second color temperature is matched to a fourth color temperature of white light.

8. A camera system according to claim 1, wherein:
    the light emitting unit includes a white light source that emits white light; and
    the controller further controls the light emitting unit so as to emit the white light from the white light source during the preparatory emission of light.

9. A camera system according to claim 1, wherein:
    the imaging element includes an imaging element for photography, and an imaging element for photometry that is different from the imaging element for photography; and
    the corrector corrects the amount of the first light to be emitted that has been calculated by the calculator, on the basis of at least one of: difference in sensitivity of the imaging element for photography caused by the color temperature difference; difference in sensitivity of the imaging element for photometry caused by the color temperature difference; and difference in reflectivity of the photographic subject caused by the color temperature difference.

10. A camera system according to claim 9, further comprising:
    a color adjustor that performs color temperature adjustment upon an image signal for photography output from the imaging element for photography, based upon a color temperature adjustment coefficient that corresponds to the first color temperature of the main emission of light.

11. A camera system according to claim 1, wherein:
    the corrector calculates reflectivity of the photographic subject, on the basis of the image capture signal that is output from the imaging element when the light emitting unit is performing the preparatory emission of light and the image capture signal that is output from the imaging element when the light emitting unit is not emitting light.

12. A camera system, comprising:
    a light emitting unit of which color temperature is variable, and that performs both a preparatory emission of light and a main emission of light when performing photography; and
    a controller that controls a color temperature during the main emission of light on the basis of predetermined information, and controls a color temperature during the preparatory emission of light so that a light emission efficiency at the color temperature during the preparatory emission of light becomes greater than or equal to a light emission efficiency at the color temperature during the main emission of light.

13. A camera system according to claim 12, wherein:
the predetermined information is color temperature of at least a portion of the photographic subject;
and further comprising a recognition unit that recognizes the color temperature of at least the portion of the photographic subject.

14. An camera system according to claim 13, wherein:
the recognition unit recognizes a color temperature of ambient light.

15. A camera system according to claim 14, wherein:
the light emitting unit performs control so that difference between the color temperature during the preparatory emission of light and the color temperature during the ambient light is less than or equal to a predetermined value.

16. A camera system according to claim 12, wherein:
the controller controls the color temperature during the preparatory emission of light to a color temperature at which the light emission efficiency is greater than or equal to a predetermined value.

17. A camera system according to claim 12, wherein:
the controller controls amount of light to be emitted during the main emission of light in consideration of a difference between the light emission efficiency at the color temperature during the preparatory emission of light and the light emission efficiency at the color temperature during the main emission of light.

18. A camera system-according to claim 12, further comprising:
a storage unit that stores a relationship between the color temperature of the light emitting unit and the light emission efficiency.

19. A camera body, comprising:
a recognition unit that is used in a camera system according to claim 13.

20. A flash device, comprising:
a light emitting unit that is used in a camera system according to claim 12.

21. An illumination method in which a main light emission in which during photography a photographic subject is illuminated with a first light having a first color temperature, and a preparatory emission of light in which the photographic subject is illuminated with a second light having a second color temperature that is different from the first color temperature are performed before photography, comprising:
capturing an image of the photographic subject and outputting an image capture signal during the preparatory emission of light;
calculating an amount of the first light to be emitted during the main emission of light on the basis of the image capture signal;
correcting the amount of the first light to be emitted that has been calculated, on the basis of a color temperature difference between the first color temperature and the second color temperature; and
performing the main emission of light at the amount of the first light to be emitted after correction.

22. An illumination method, comprising:
performing a main emission of light in which a photographic subject is illuminated with light having a first color temperature during photography;
determining a second color temperature that is different from the first color temperature, so that a light emission efficiency at the first color temperature is greater than or equal to a light emission efficiency at the second color temperature; and
performing a preparatory emission of light in which the photographic subject is illuminated with light having the second color temperature before photography.

* * * * *